United States Patent [19]
Castrodale et al.

[11] 4,089,029
[45] May 9, 1978

[54] DATA STORAGE APPARATUS USING A FLEXIBLE MAGNETIC DISK

[75] Inventors: Daniel Owen Castrodale, Rochester, Minn.; William John Pendy, Jr., Atlanta, Ga.; William Stewart Wentink, Rochester, Minn.

[73] Assignee: International Business Machines Corporation, Armonk, N.Y.

[21] Appl. No.: 776,456

[22] Filed: Mar. 10, 1977

Related U.S. Application Data

[63] Continuation of Ser. No. 570,118, Apr. 21, 1975, abandoned.

[51] Int. Cl.² ............................ G11B 5/54; G11B 5/60; G11B 25/04
[52] U.S. Cl. ................................. 360/99; 360/86; 360/105
[58] Field of Search ............... 360/99, 97, 98, 86, 360/102–103, 133, 135

[56] References Cited
U.S. PATENT DOCUMENTS

| | | | |
|---|---|---|---|
| 3,529,301 | 9/1970 | Hiruta | 360/97 |
| 3,678,481 | 7/1972 | Dalziel et al. | 360/99 |
| 3,702,461 | 11/1972 | Cantwell | 360/103 |
| 3,713,121 | 1/1973 | Fasano | 360/103 |
| 3,740,736 | 6/1973 | Dion | 360/86 |
| 3,812,535 | 5/1974 | Higgins et al. | 360/103 |
| 3,879,757 | 4/1975 | Elliott et al. | 360/99 |
| 3,896,495 | 7/1975 | Beecroft | 360/103 |
| 3,914,541 | 10/1975 | Elliott | 360/102 |
| 3,914,792 | 10/1975 | Beecroft | 360/103 |

*Primary Examiner*—Alfred H. Eddleman
*Attorney, Agent, or Firm*—Keith T. Bleuer

[57] ABSTRACT

A data storage apparatus having a thin flexible disk with magnetic recording surfaces on both faces and a carriage embracing the disk and carrying a pair of transducers in contact with opposite faces of the disk. Each of the transducers is mounted on a relatively weak gimbal spring. Relative rigid load arms bear on dimples located at the centers of the transducers to form universal joint connections with the transducers. The gimbal springs and universal joint connections allow the transducers to pitch and roll with wobbling movements of the flexible disk without movement of the load arms. The load arms are mounted on relatively stiff gimbal spring portions for applying a predetermined force to the transducers holding them in engagement with the disk while allowing yielding movement of the transducers in directions normal to the disk engaging faces of the transducers.

28 Claims, 16 Drawing Figures

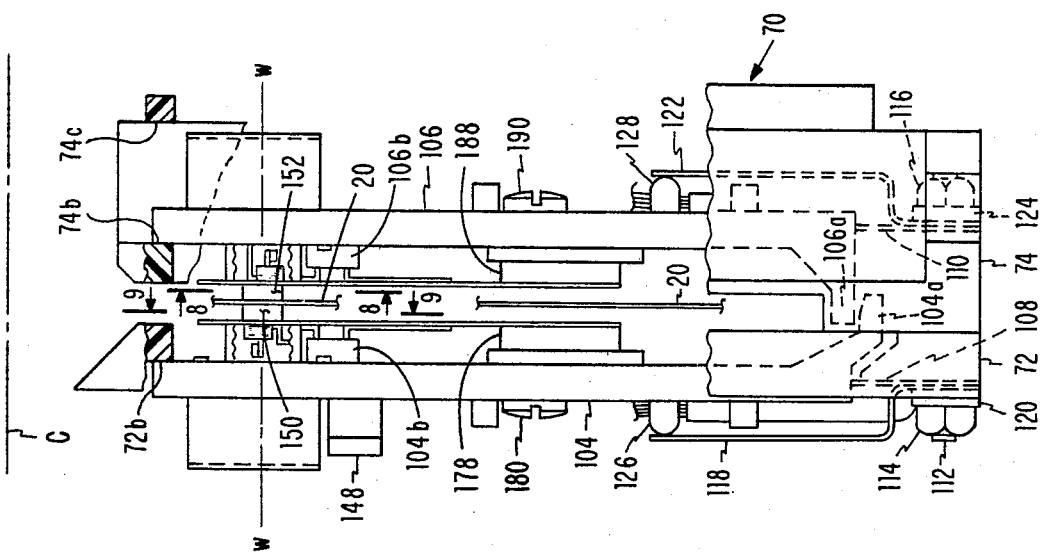
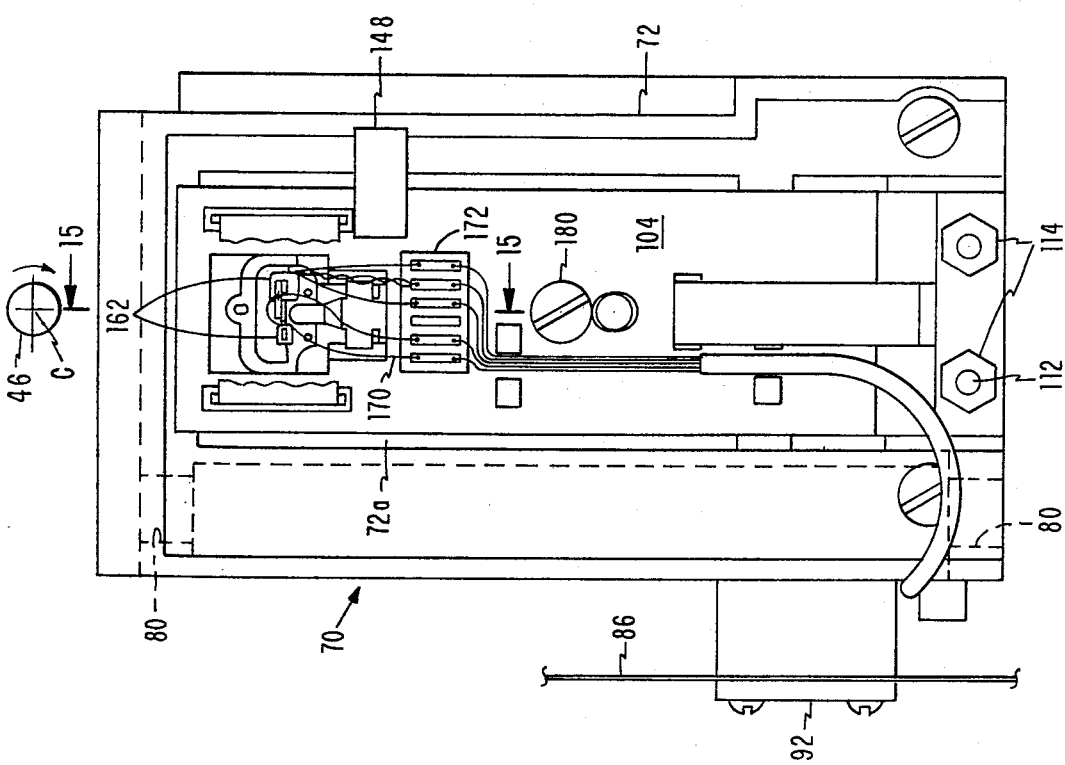
FIG. 7
FIG. 6

DATA STORAGE APPARATUS USING A FLEXIBLE MAGNETIC DISK

CROSS-REFERENCES TO RELATED APPLICATIONS

This application is a continuation of our prior application for Data Storage Using A Flexible Magnetic Disk, Ser. No. 570,118, filed Apr. 21, 1975 now abandoned and is related to U.S. Pat. No. 3,946,439 and to a reissue application corresponding to this patent, namely, D. O. Castrodale et al application, Ser. No. 724,663, filed Sept. 20, 1976, for Recording Apparatus for Magnetic Disks Using Both Sides of the Disk (now U.S. reissue patent 29,380).

BACKGROUND OF THE INVENTION

The invention relates to magnetic disk data storage apparatus and in particular to such apparatus employing flexible magnetic disks contained in protective envelopes.

Apparatus for recording on only one side of such disks has been in common use. U.S. Pat. No. 3,678,481 issued July 18, 1972, for example, discloses the use of a magnetic disk assembly of this type in which recording takes place on only one side of the disk. A U-shaped carriage assembly embraces the disk, and the carriage has a pressure pad in one leg and a magnetic transducer or head in the other leg; and the pressure pad moves the disk toward the head in order to provide magnetic recording on one side of the disk.

Data storage apparatus employing a magnetic disk assembly of this type has also been proposed in the patent to James F. Elliott et al, U.S. Pat. No. 3,879,757 issued Apr. 22, 1975. The Elliott et al apparatus provides for recording on both sides of a magnetic disk, utilizing a pair of heads which are alternately moved into recording contact with the disk. The construction of this patent includes a recording head which deflects the disk out of planar shape with bending and yielding of the disk taking place at the time of data transfer between head and disk. There may be a rather large dimensional range existing between the disk and head positions (the head may bear into the disk a greater or less amount); and the head to disk compliance and wear characteristics are affected by these dimensional tolerances between heads and disk. In addition, the optimum parameters for these variables in terms of peak compliance and long head-disk life are difficult to determine. Control of the disk location and head-disk contact, due to head penetration, also adds cost to the mechanism.

SUMMARY OF THE INVENTION

It is an object of the invention to provide an improved data storage apparatus utilizing a flexible disk and which allows both sides of the disk to simultaneously have information encoded thereon or read therefrom.

It is a more specific object of the invention to provide a carriage embracing such a flexible disk and carrying a pair of transducers simultaneously engaging with the opposite sides of the disk so that data transfer can take place simultaneously with respect to both of the disk sides, although only one of the transducers may be used at a time if desired.

It is still a more particular object of the invention to provide improved spring mounting means for such a pair of transducers which allow a relatively easy pitching and rolling of the transducers with a warped or wobbling disk and which yet apply a predetermined force onto the transducers for maintaining them in data transferring contact with the disk. It is still another object of the invention to provide improved universal mounting means for such a pair of transducers which allow such pitching and rolling of the transducers without any necessary yielding of spring loaded load arms urging the transducers into contact with the disk.

BRIEF DESCRIPTION OF THE DRAWINGS

FIG. 6 is a front elevational view of a transducer carrying carriage incorporated in the apparatus and also showing diagrammatically the location of a drive shaft of the data storage apparatus;

FIG. 7 is a side view of the carriage and also showing the center line of the drive shaft;

DESCRIPTION OF THE PREFERRED EMBODIMENT

Magnetic Disk Assembly

Figure 1:
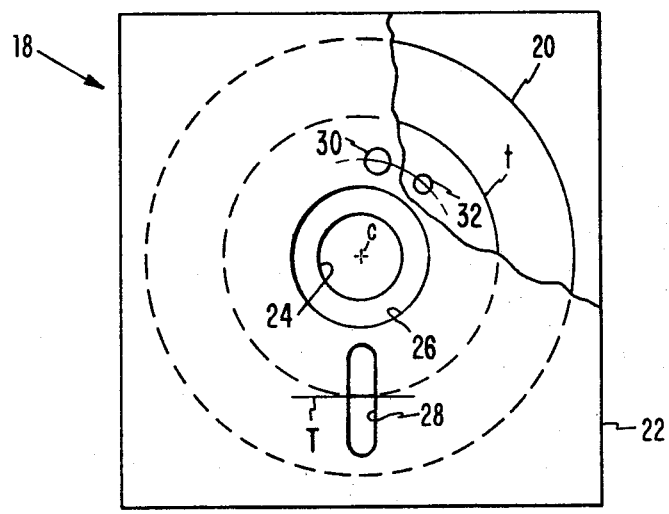
FIG. 1 is a plan view of a flexible magnetic disk forming an assembly with an enclosing envelope which may be used with the apparatus of the invention (the envelope is partially broken away for more clearly illustrating the magnetic disk therein)

Referring to FIG. 1 in particular, the magnetic disk assembly 18 utilized by the data storage apparatus of the invention may be seen to comprise a magnetic disk 20 disposed within a square envelope or jacket 22. The disk 20 is of a thin, flexible material, such as polyethylene tetephthalate of about 0.003 inch thickness; and the disk 20 has an unoriented $\gamma Fe_2O_3$ coating on both sides. The envelope 22 may be of a more rigid, but still somewhat flexible, vinyl sheet material of 0.010 inch thickness, for example. The disk 20 has a central opening 24, and the envelope 22 has larger central openings 26 in its two thicknesses. In addition, the envelope 22 has aligned radial slots 28 and aligned round openings 30 in its two thicknesses. The disk 20 rotates about its center $c$ in the envelope 22, and openings 30 are adapted to align with an opening 32 in the disk 20 as the disk 20 rotates within the envelope 22. The disk 20 has a series of concentric magnetic tracks $t$ on its two sides, and one of these tracks $t$ is shown in FIG. 1. An assembly of this type is disclosed in U.S. Pat. No. 3,668,658 issued June 6, 1972, which may be referred to for more detail of the assembly.

Data Storage Apparatus

Referring to FIGS. 2–5, the data storage apparatus may be seen to include a backbone or frame assembly 34 having a cover 36 swingably mounted thereon by means of pivots 38. The frame assembly 34 is formed with a pair of opposite, downwardly tapering slots 40 for receiving a disk assembly 18 (for the purpose of this description, the frame assembly 34 is considered to be vertically disposed, with the wide open ends of the slots 40 at the top, although it will be understood that the frame assembly 34 and the data storage apparatus can as well be used in other dispositions). The frame assembly 34 is provided with a pair of stops 42 (see FIG. 3) on opposite sides for limiting the downward movement of the assembly 18 within the slots 40. The frame assembly is also provided with a protruding platen portion 44 (see FIGS. 2 and 5) for supporting the envelope 22 as will be hereinafter described. A shaft 46 is rotatably disposed in the frame assembly 34 at a level above the stops 42 and is rotatable about its center C. The shaft 46 is formed with a drive rim or flange portion 48 and with a central countersunk depression 50 in one end of the shaft 46 (see FIGS. 2 and 3). A pulley 52 is fixed on the other end of the shaft 46, and the pulley 52 is driven from a drive motor 54 located on the bottom of the frame assembly 34, the drive being by means of a belt 56 which extends around the pulley 52 and around the output pulley 58 of the motor 54. The belt 56 is maintained taut by means of an idler roll 60 mounted on a swing arm 62 that in turn is acted on by a spring 64 (see FIG. 4).

The cover 36 has a tapered collet 66 (see FIG. 2) rotatably mounted therein and loaded by a spring 68, and the collet 66 is adapted to enter the countersunk depression 50 in the end of the shaft 46 when the cover 36 is swung toward the frame assembly 34 so as to capture a disk 20 between the collet 66 and the rim 48 for driving the disk. Any suitable latching means may be used for holding the cover 36 in closed disposition clamping disk 20 between the collet 66 and the rim 48.

A carriage 70 (see FIGS. 3, 4, 5 and 15) is slideably disposed in the frame assembly 34 in such a manner as to move toward and away from the center C of the shaft 46. The carriage 70 embraces the disk assembly 18 resting on the stops 42 and has one part 72 on one side of the disk assembly and has a second part 74 fixed with respect to the part 72 and disposed on the other side of the disk assembly 18 (see FIGS. 5, 6 and 7). A pair of guide rods 76 and 78 are fixed with respect to the frame assembly 34 and extend through openings 80 and 82 in the part 74 for guiding the carriage 70 radially with respect to the center C of the shaft 46. A motor 84 (which is preferably of the electrical stepping type) is provided for moving the carriage 70 radially with respect to the shaft 46 (see FIG. 4). The motor 84 is coupled with the carriage 70 by means of a flexible steel band 86 that extends around an output pulley 88 of the motor 84 and around an idler pulley 90. The band 86 is fixed with respect to the carriage 70 by a suitable clamping means 92. The idler pulley 90 is disposed on the end of a cantilever leaf spring 94 so as to maintain the band 86 under tension. The leaf spring 94 on its end is fixed in a holder 96 that is fixed with respect to the frame assembly 34 by means of screws 98. A spring 100 is provided between the holder 96 and a pin 102 fixed to the frame assembly 34, and the tautness of the band 86 may be set at a desired level by allowing the spring 100 to pull the holder 96 downwardly as seen in FIG. 4 before tightening the screws 98 to fix the holder 96 with respect to the frame assembly 34.

Figure 5:
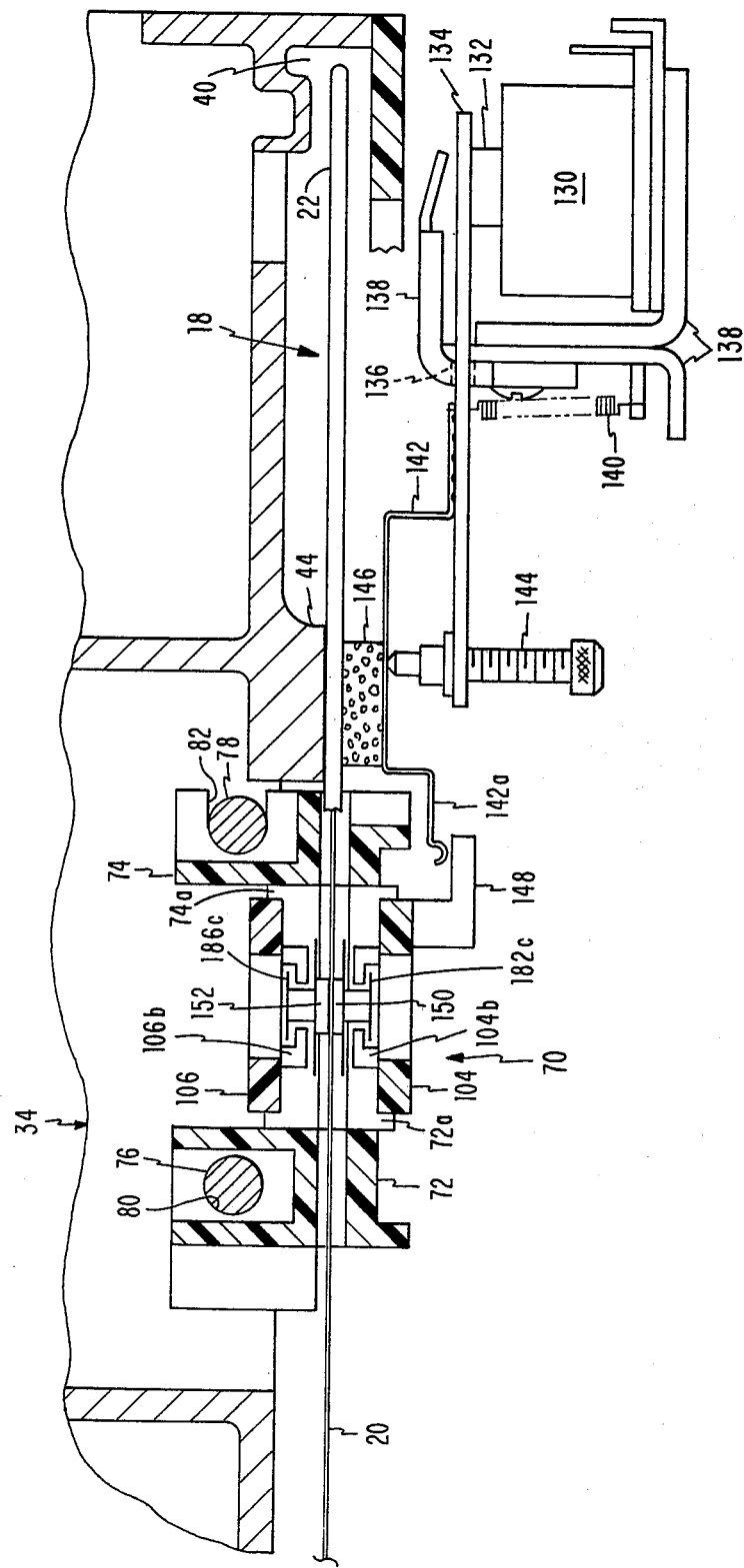
FIG. 5 is a sectional view of an enlarged scale taken on line 5—5 of FIG. 3.

Swing arms 104 and 106 are respectively disposed within openings 72a and 74a in the parts 72 and 74 (see FIGS. 5, 6 and 7). Leaf springs 108 and 110 are embedded in the lower ends of the swing arms 104 and 106 respectively; and the springs 108 and 110 are fixed with respect to the lower end of the part 74 by means of threaded bolts 112, which are embedded in part 74, and nuts 114 and 116. A leaf return spring 118 and a washer plate 120 are disposed between the part 74 and the nuts 114, and a leaf return spring 122 and a washer plate 124 are provided between the part 74 and the nuts 116. The return springs 118 and 122 respectively bear against protrusions 126 and 128 on the outer surfaces of the swing arms 104 and 106 for urging the swing arms 104 and 106 toward each other so that they bear against abutment surfaces 72b and 74b of the parts 72 and 74. The swing arms 104 and 106 are respectively provided with an underlying arm portion 104a and an overlying arm portion 106a which cooperate together so that the swing arms 104 and 106 move toward and away from their abutment surfaces 72b and 74b at the same time.

An electromagnet 130 (see FIGS. 2, 3 and 5) is provided for swinging the arm 104 outwardly and for thereby at the same time swinging the arm 106 outwardly due to coaction between the arm portions 104a and 106a. The electromagnet 130 has a core 132, and an armature 134 moves toward and away from the core 132. The armature 134 is in the form of a lever which extends through and is fulcrumed by the edges of an opening 136 in a standard 138 that is fixed with respect to the frame assembly 34. A spring 140 is provided between the standard 138 and the lever 134. A lever extension 142 of relatively thin flexible material is fixed at its base end to the lever 134, and an adjustment screw 144 and is in contact with the lever extension 142 for adjusting extension 142 with respect to lever 134.

Figure 3:
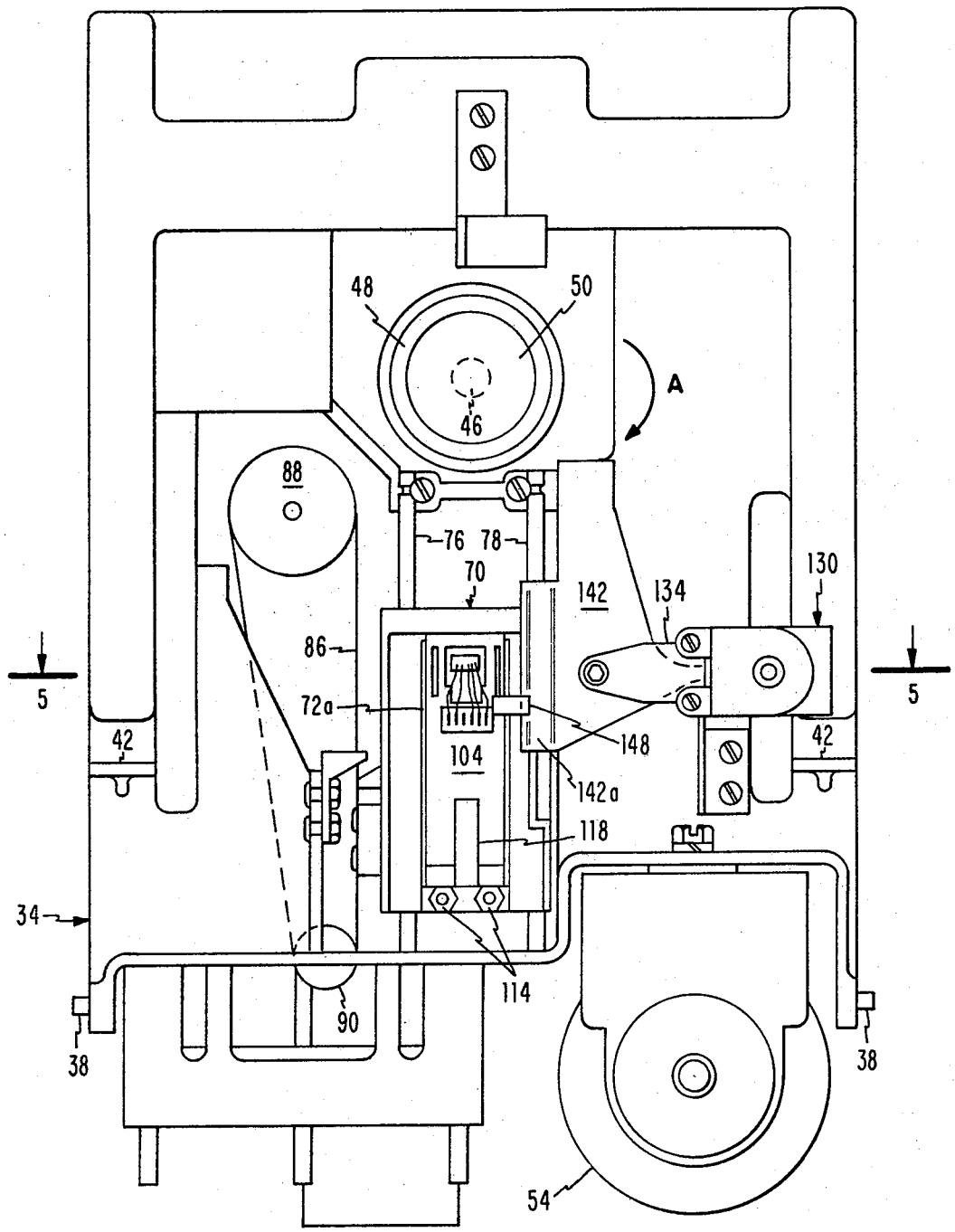
FIG. 3 is a front elevational view of the internal mechanism of the apparatus shielded by the cover and taken from one side of the main frame.
Figure 4:
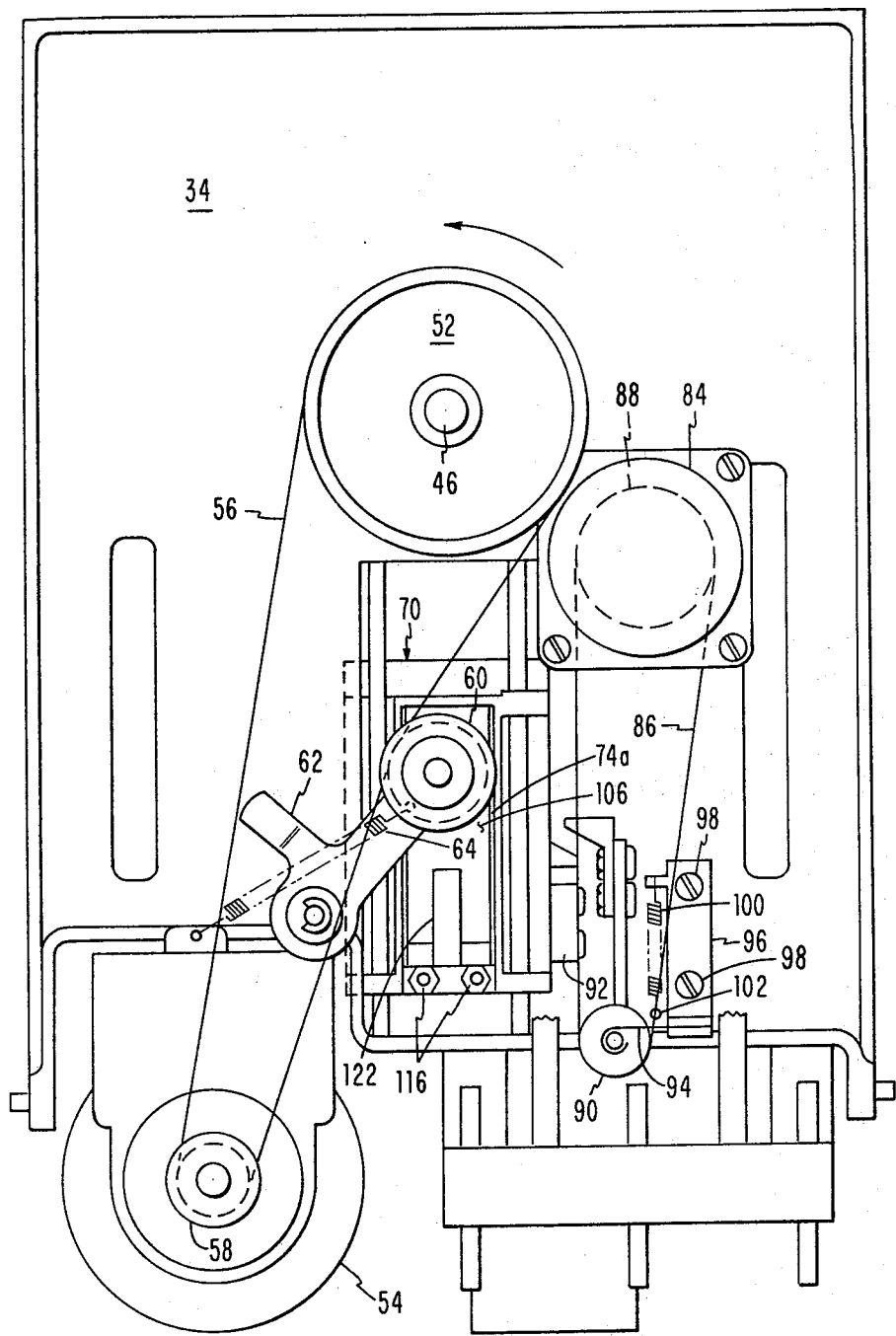
FIG. 4 is a rear elevational view of the apparatus taken from the other side of the main frame.

As seen in FIG. 3, the extension 142 is quite elongate vertically in comparison with the lever 134, and the lever extension 142 carries a foam rubber pressure member 146 (see FIG. 5) that is located opposite the platen portion 44 of the frame assembly 34. The lever extension 142 also has a shorter but elongate end portion 142a that is disposed beneath a hook 148 fixed to the outer surface of the swing arm 104. Adjustment screw 144 is positioned to achieve a gap between the end portion 142a and hook 148 when electromagnet 130 is energized.

Figure 8:
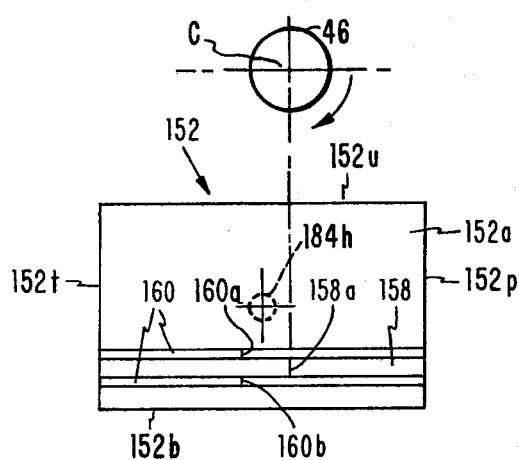
FIGS. 8 and 9 are sectional views on enlarged scales taken on lines 8—8 and 9—9 of FIG. 7 and showing the active faces of a pair of transducers included in the apparatus and also showing diagrammatically the location of the drive shaft of the apparatus.
Figure 9:
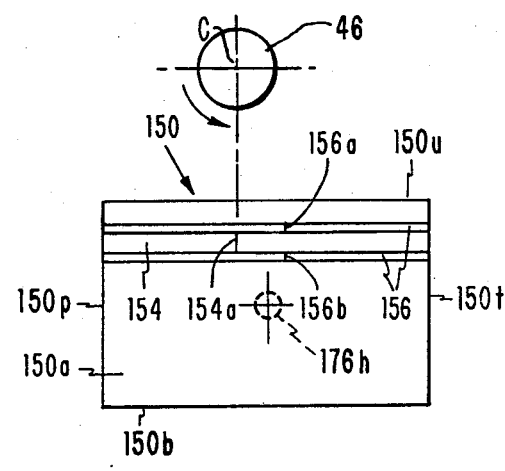
Figure 15:
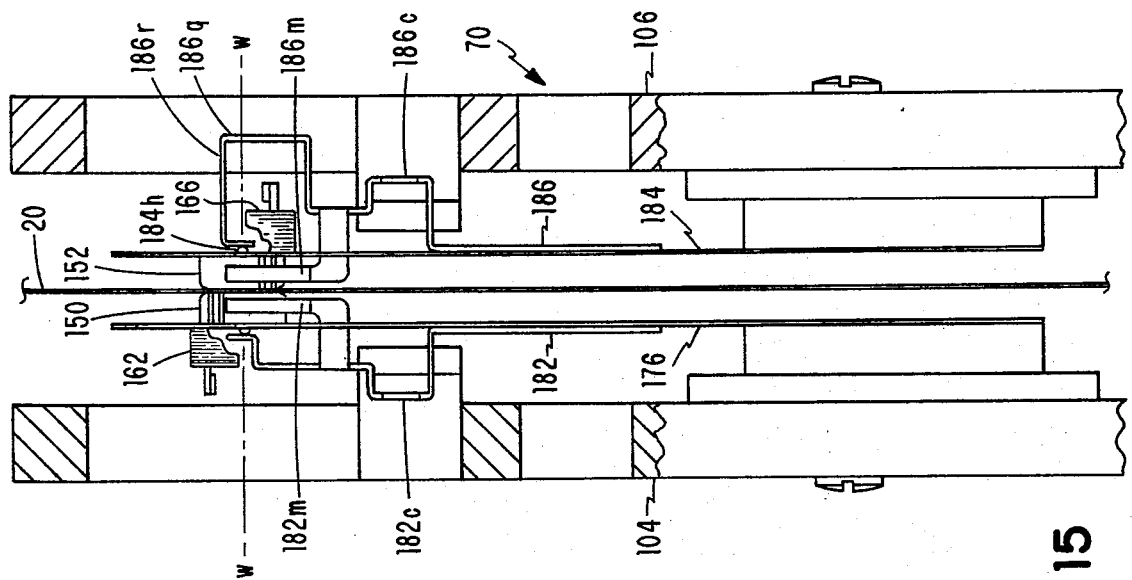
FIG. 15 is a sectional view on an enlarged scale taken on line 15—15 of FIG. 6.
Figure 16:
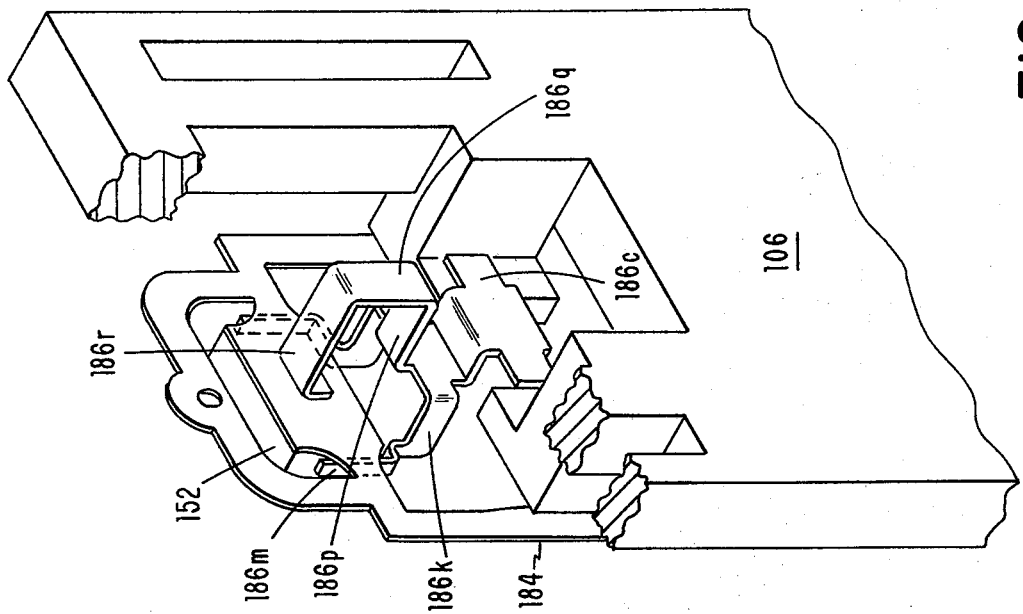
FIG. 16 is a fragmentary isometric view of one of the transducer, gimbal spring and load arm support assemblies of the data storage apparatus but omitting a showing of the magnetic cores and coils of the transducer for clearness of illustration of other parts.

The swing arm 104 carries an electromagnetic transducer 150, and swing arm 106 carries an electromagnetic transducer 152 (see FIGS. 5 and 7). The transducers 150 and 152 are in the form of rectangular blocks of the same cross sectional size and are positioned on opposite sides of the disk 20 in exact register with each other as is shown in FIGS. 7 and 15. More particularly, the upper transducer edges 150u and 152u are in register, and this is true also of the bottom edges 150b and 152b, the leading or preceding edges 150p and 152p, and the trailing edges 150t and 152t (see FIGS. 8 and 9). The transducer surfaces 150a and 152a (see FIGS. 8 and 9) are flat, and they make face to face contact with the surfaces of the disk 20. The transducer 150 has a read/write magnetic core 154 and a pair of spaced erase cores 156 which are disposed adjacent to the upper edge 150u of the transducer 150 as illustrated in FIG. 9. The core 154 is exactly in alignment with the median axis of the spaced erase cores 156, and these cores have gaps 154a, 156a and 156b in them for information transfer and erasing with respect to the surfaces of the disk 20.

The transducer 152 has a read/write magnetic core 158 with gap 158a and a pair of erase magnetic cores 160 with gaps 160a and 160b. The construction of the cores 158 and 160 is similar to the construction of the cores 154 and 156, but the cores 158 and 160 are disposed adjacent the bottom edge 152b of the transducer 152 as is illustrated in FIG. 8. It will thus be apparent that the cores 158 and 160 are spaced farther outwardly from the center C of the shaft 46 (which is shown diagrammatically in FIGS. 8 and 9 for reference purposes) and from the center c of disk 20 when the disk assembly 18 is installed in the storage apparatus than are the cores 154 and 156, and the cores of the two transducers 150 and 152 are in misalignment. Energizing coils 162 are provided for the cores 154 and 156, and energizing coils 166 are provided for the cores 158 and 160 (see FIGS. 10–13 and 15). Flexible leads 170 (see FIG. 6) may be used for connecting the coils 162 and 166 with terminal boards 172 on the outer surfaces of the swing arms 104 and 106.

Figure 10:
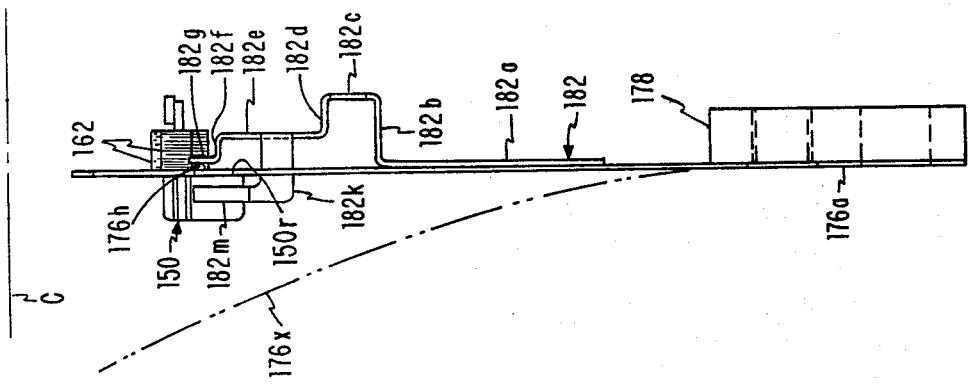
FIG. 10 is a side elevational view on an enlarged scale showing a gimbal spring and load arm support for the transducer shown in FIG. 9 and also showing the center line of the drive shaft.
Figure 11:
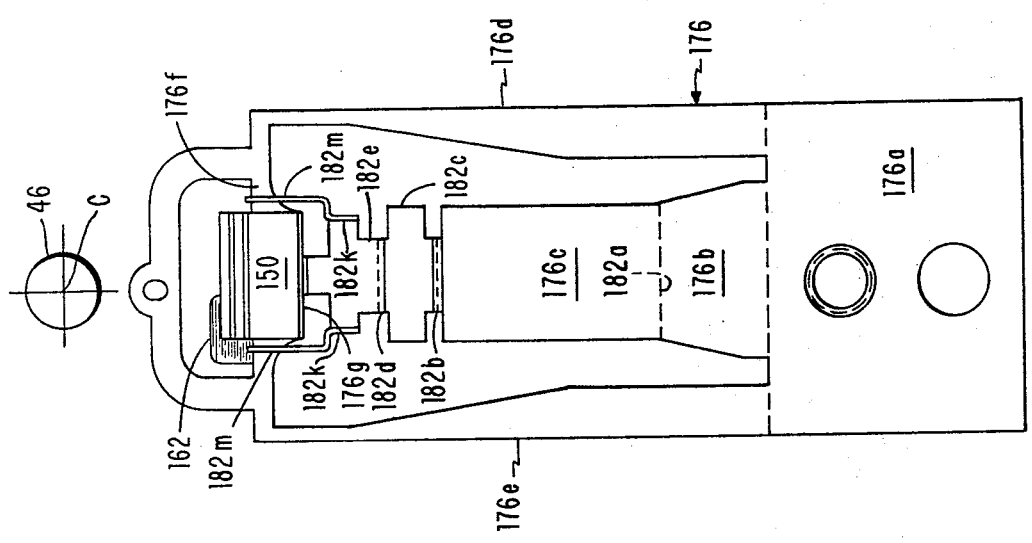
FIG. 11 is a front elevational view of the spring and load arm support shown in FIG. 10 and showing the drive shaft diagrammatically.

The transducer 150 is fixed onto the surface of a leaf gimbal spring 176 of relatively thin flexible spring steel (see FIGS. 10 and 11). The spring 176 comprises base portions 176a and 176b, an upwardly extending middle portion 176c, a pair of relatively narrow leg or finger portions 176d and 176e at the sides of the portion 176b, and transversely extending top portions 176f and a relatively wide middle portion 176g that extends downwardly (as seen in FIGS. 10 and 11 and away from the center C of the drive shaft 46). The transducer 150 is fixed as by any suitable bonding, for example, to the relatively wide spring portion 176g. The spring 176 in its wide portion 176g is provided with an upraised dimple 176h, and the dimple 176h is exactly centered with respect to the opposite edges 150u and 150b and the opposite edges 150p and 150t of the transducer 150 as shown in FIG. 9. The dimple 176h is thus geometrically centered with respect to the disk engaging face 150 viewing the transducer 150 normally to the face 150a as in FIG. 9. The spring 176 is welded to a relatively thick rigid block 178, and a screw 180 extends through the arm 104 and is screwed into the block 178 so as to fix the spring 176 and block 178 with respect to the arm 104 (see FIGS. 6 and 7).

A load arm 182 (see FIG. 10), which is of relatively thick rigid material compared to that of the spring 176, is welded to the medial portion 176c of the spring 176. The arm 182 comprises a rectangular base portion 182a, a relatively narrow connecting portion 182b, a pair of wings 182c, a relatively narrow connecting portion 182d, a portion 182e extending at right angles to the portion 182d and terminal portions 182f and 182g extending at right angles to each other. The portion 182g extends upwardly (as seen in FIG. 10 and toward drive shaft 46) and contacts the dimple 176h. A pair of flaps 182k are formed off of the portion 182e, and each of the flaps 182k terminates in a finger 182m that underlies one of the spring portions 176f. It will be observed from FIG. 10 in particular that the portions 182f and 182g of the load arm 182 lie below the coils 162 (or more remote from the shaft center C than the coils 162) so that spring 176 may bear on dimple 176h without interfering with coils 162 located close to the top of transducer 150 as it appears in FIG. 10.

Figure 12:
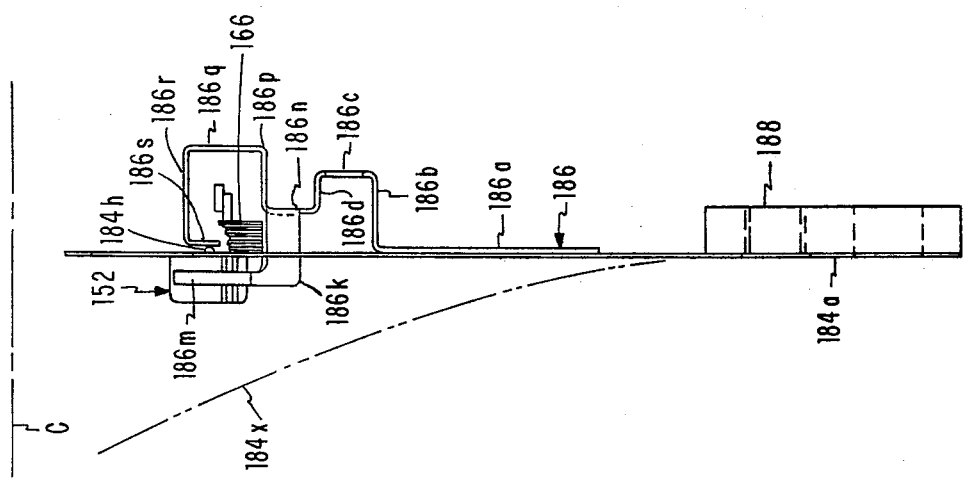
FIG. 12 is a view similar to FIG. 10 but showing the gimbal spring and load arm support for the transducer of the apparatus which is shown in FIG. 8.
Figure 13:
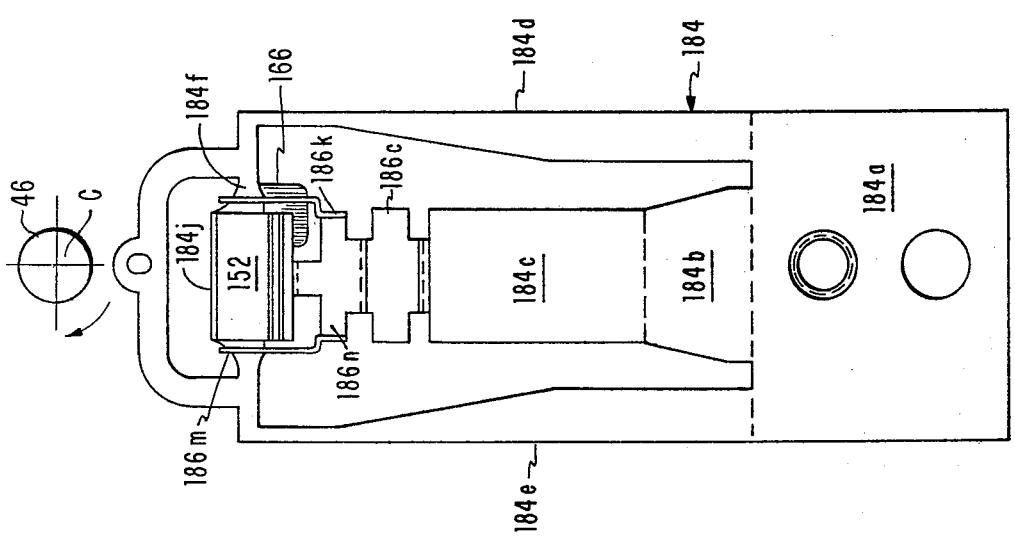
FIG. 13 is a front elevational view of the spring and load arm support shown in FIG. 12.

The transducer 152 is fastened with respect to the swing arm 106 by a gimbal spring 184 and a load arm 186 (see FIGS. 12 and 13) that are quite similar to the spring 176 and load arm 182. A block 188 similar to the block 178 is used to anchor the spring 186, and a screw 190 (see FIG. 7) extends through the swing arm 106 and is screwed into the block 188 to fix the spring 184 and load arm 186 with respect to the swing arm 106. The spring 184 has the portions 184a, 184b, 184c, 184d, 184e and 184f that are similar to the spring parts 176a, 176b, 176c, 176d, 176e and 176f. The spring 184 differs from the spring 176 in that the portion 184j, which takes the place of the spring portion 176g, extends upwardly (as seen in FIGS. 12 and 13 and toward the center C of shaft 46) rather than downwardly as does the spring portion 176g. Clearance for cores 158 and 160 located closer to the bottom transducer edge 152b than to the upper transducer edge 152u (see FIG. 8) is thus provided. The transducer 152 is fixed on the spring portion 184j so that it is opposite to the transducer 150. The load arm portions 186a, 186b, 186c and 186d are substantially identical to the load arm portions 182a, 182b, 182c and 182d; but the load arm 186 terminates in the portions 186n, 186p, 186q, 196r and 186s that are unique to the load arm 186. The load arm portions 186n, 186p, 186q, 186r and 186s all extend at right angles to each other; and these load arm portions have such dimensions so that they extend over the coils 166 with portion 186r in particular positioned between coils 166 and shaft center C. The load arm portion 186s extends downwardly (as seen in FIG. 12, away from drive shaft center C) and makes contact with the dimple 184h which is located in exactly the geometrical center of the transducer 152 viewing the transducer 152 normally to its disk engaging face 152a as in FIG. 9. The load arm portions 186m underlie the spring portions 184f as seen in FIGS. 12 and 13.

The springs 176 and 184 are illustrated in FIGS. 10 and 12 in their straight line vertical dispositions which they have when the parts of the carriage 70 are in their positions as illustrated in FIGS. 6 and 7, with the swing arms 104 and 106 being in contact with the stops 72b and 74b and with the transducers 150 and 152 bearing against each other through the intermediary of the disk 20. When the assembly of the spring 176, load arm 182 and block 178 and the assembly of the spring 184, the block 188 and the load arm 186 are disassociated from the rest of the carriage 70 and are isolated with respect to each other; the center lines of the springs 176 and 184 are the center lines 176x and 184x as illustrated in FIGS. 10 and 12. The spring portions 176b and 184b have bends in them to provide a curvature of the spring 176 along its length and a curvature of the spring 184 along its length, the spring portions 176b and 184b being preset in this respect. The curvatures, when the springs 176 and 184 are in assembled condition as shown in FIG. 7, provide a bearing force of the transducers 150 and 152 against each other under the spring action of the springs 176 and 184, firmly holding the flat outer surfaces 150a and 152a of the transducers 150 and 152 against the surfaces of the disk 20. Under these conditions, the load arm portions 182g and 186s bear against the dimples 176h and 184h, providing the forces from the spring portions 176b and 184b to the transducers 150 and 152 transmitted through the load arms 182 and 186. The spring portions 176b and 184b are relatively wide and are thus relatively stiff, and these forces applied to the transducers 150 and 152 holding them together are relatively high. Under these conditions, the dimples 176h and 184h are located directly opposite each other on an axis w (see FIGS. 7 and 15) normal to the plane of the magnetic disk 20.

The gimbal springs 176 and 184 are of relatively thin material, and the leg portions 176d, 176e, 184d and 184e are relatively long and thin. In addition, these leg portions do not have an inherent bend in them corresponding to the inherent bends of portions 176b and 184b and in the flat dispositions of the springs 176 and 184 as seen in FIGS. 10 and 12 do not exert any force in any direction on the transducers 150 and 152. The springs 176 and 184 thus provide very little force resisting rolling and pitching of the transducers 150 and 152 about the dimples 176h and 184h, as will be hereinafter more fully described.

Operation

In operation, the electromagnet 130 is initially in de-energized condition. The spring 140 is then active to hold the lever 134 in a position swung counterclockwise from its position as shown in FIG. 5 so that the pressure member 146 is spaced with respect to the platen portion 44 farther than shown in FIG. 5. The lever extension 142a is effective on the hook 148 fixed to the swing arm 104, and the swing arm 104 is thus swung counterclockwise as seen in FIG. 7 from its position shown in this figure against the action of the return spring 118 and using the spring 108 as a flexure joint. The lever portion 104a underlying the lever portion 106a is effective to cause a corresponding swinging movement of the swing arm 106 against the action of the return spring 122, using the spring 110 as the flexure for the swing arm 106. The swing arm 106 is thus swung in the clockwise direction as seen in FIG. 7. The clockwise movement of the swing arm 106 as seen in FIG. 7 is limited by the stop 74c formed on the part 74. Since the clockwise movement of the arm 106 is thus limited, the counterclockwise movement of the arm 104 is likewise limited due to the interaction of the portions 104a and 106a. The portions 104b of the swing arm 104 underlie the wing portions 182c (see FIG. 5), and the load arm 182 is thus moved outwardly along with the swing arm 104. The fingers 182m underlying the spring portions 176f (see FIG. 10) act on the spring portions 176f and likewise pull the upper end of the spring 176 and particularly its portions 176f and 176g outwardly along with the swing arm 104. The transducer 150 is thus pulled away from its position as illustrated in FIG. 7, being moved counterclockwise from its FIG. 7 position along with the lever 104 when the electromagnet 130 is in de-energized condition. The wing portions 186c of the load arm 186 corresponding to the wing portions 182c are likewise effective to pull the load arm 186 outwardly by the action of the swing arm 106, in the clockwise direction as seen in FIG. 7; and the fingers 186m of the arm 186 corresponding to the fingers 182m are effective to pull the spring portions 184f and 184j in this same direction. The spring portions 176g and 184j are thus pulled apart; and likewise the transducers 152 and 150 are held apart, with the electromagnet 130 being in de-energized condition.

Figure 2:
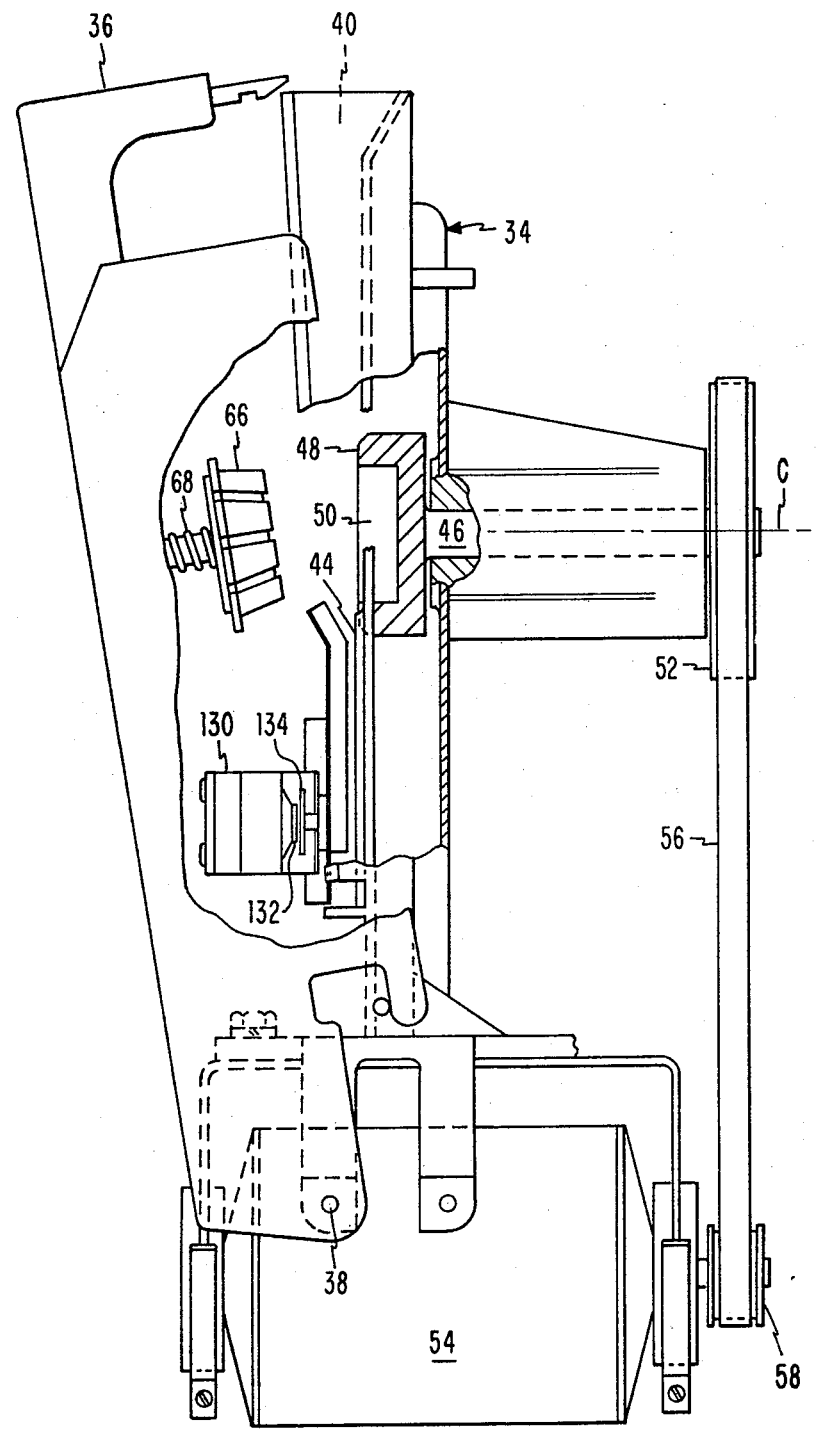
FIG. 2 is a side elevational view of the data storage apparatus of the invention and including a swingable cover for shielding certain internal mechanism and for allowing an assembly as shown in FIG. 1 to be inserted into the apparatus.

It is assumed that the cover 36 is unlatched with respect to the frame assembly 34, and the cover 36 is thus swung outwardly about its pivots 38 (see FIG. 2). Under these conditions, the collet 66 is separated from the drive rim 48. With these separations of collet 66 and drive rim 48 and of transducers 150 and 152 and of pressure member 146 and platen 44, a disk assembly 18 is dropped into the slots 40 and moves freely down through the slots 40 until the disk assembly 18 bottoms on the stops 42 (see FIG. 3). Under these conditions, the opening 24 and its center c in the disk 20 are approximately aligned with the center C of the shaft 46 and the drive rim 48. At this time, the cover 36 is swung closed with respect to the frame assembly 34, moving in the clockwise direction as seen in FIG. 2, until the cover 36 is latched closed with respect to the frame assembly 34. As the cover 36 closes, the collet 66, which is tapered, moves through the central opening 24 of the disk 20 and centers the disk 20 with respect to the drive rim 48. The collet 66 then clamps the disk 20 with respect to the drive rim 48; and, when the cover 36 is completely closed, the spring 68 is compressed and firmly holds the disk 20 on the drive rim 48 and between the rim 48 and the collet 66. The disk center c is then in alignment with the shaft center C. With the motor 54 energized, the disk 20 is drivingly rotated by means of the drive rim 48, the shaft 46, the pulley 52, the belt 56 and the motor pulley 58. The rotation of the disk 20 is in the direction A as seen in FIG. 3.

With the disk 20 being clamped between the collet 66 and drive rim 48 and being in rotation, the electromagnet 130 is energized so as to move the lever 134 into contact with the magnet core 132, swinging the lever 134 clockwise as seen in FIG. 5 about its fulcrum provided by the edges of opening 136. The lever extension 142 carries the rubber pressure member 146, and the pressure member 146 is thus moved to clamp the disk assembly 18 between it and the platen portion 44 of frame assembly 34.

The lever extension 142a underlies the hook 148 on the swing arm 104, and the lever 134 in moving in the clockwise direction as seen in FIG. 5 allows the swing arm 104 to move in the clockwise direction as seen in FIG. 7 into contact with the stop 72b formed on the member 72. This swinging movement of the arm 104 is under the action of the return spring 118 effective on the arm 104. At the same time, the arm 106 swings in the counterclockwise direction under the action of its return spring 122 so as to move into contact with the stop 74b formed on the member 74. This is by virtue of the fact that the underlying portion 104a of the lever 104 moves out of holding relationship with respect to the arm portion 106a of the lever 106. With these movements of the swing arms 104 and 106, the transducers 150 and 152 move through the slots 28 in the opposite thicknesses of the envelope 22 and into pressure contact with the opposite sides of the disk 20. Under these conditions, the fingers 182m (see FIGS. 10 and 11) of the load arm 182 have moved away from the spring portions 176f and no longer support the gimbal spring 176, and the wings 182c of the load arm 182 have moved away from the portions 104b (see FIG. 5) of the swing arm 104 previously supporting the wings 182c to free the gimbal spring 176 from the swing arm 104. The same action has occurred with respect to the load arm 186, the gimbal spring 184 and the swing arm 106 to free the gimbal spring 184 with respect to the swing arm 106.

Under these conditions, the transducers 150 and 152 are held in simultaneous pressure contact with the opposite faces of the disk 20 for a magnetic reading or writing action on both sides of the disk 20. The transducers 150 and 152 may be simultaneously energized to both write on disk 20 or may be simultaneously used to both read from disk 20. These simultaneous actions may occur, since the cores 154 and 158, which are the cores used for reading and writing, are out of line with respect to each other so that there can be so cross-talk between the two transducers. The core 154 is closer to the upper transducer edge 150u, and the core 158 is closer to the lower transducer edge 152b; considering the fact that the transducer faces 152a and 150a are in exact alignment with respect to each other on the opposite sides of disk 20. An erasing action occurs only in connection with a writing action by either of the transducers 150 and 152 so as to cause the magnetic tracks t of disk 20 to be cleanly spaced. Obviously, either of the transducers 150 and 152 may be used for either a reading or writing action without any usage of the other transducer for reading or writing at this time.

Figure 14:
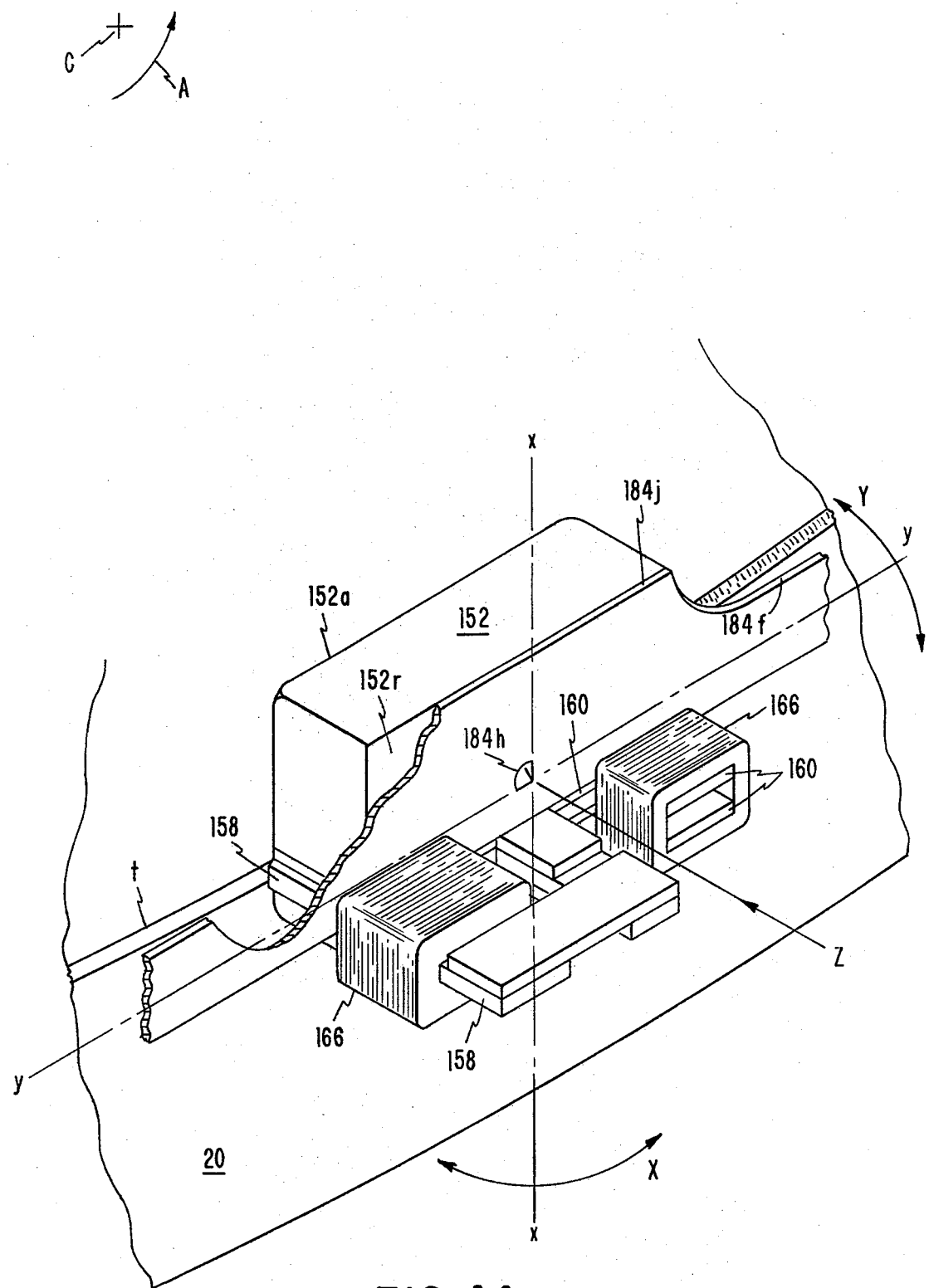
FIG. 14 is an isometric view of the transducer shown in FIG. 8 and illustrating various movements given to the transducer with rotation of a flexible disk.

The load arm portion 182g and dimple 176h provide a type of universal joint connection between the load arm 182 and the transducer 150, and the same is true of the load arm portion 186s and dimple 184h with respect to the transducer 152. The transducers 150 and 152 may thus quite freely rotate or swing in either the direction X or in the direction Y (see FIG. 14 with respect to transducer 152) without any corresponding translating movement of the transducer 152 in the direction Z and corresponding movement of the transducer 150 in the direction Z. The directions X and Y are arcuate about axes $x$ and $y$, respectively, which are parallel with the disk 20 and with the faces 152a and 150a; and the direction Z is normal to the disk 20 and faces 150a and 152a. The axes $x$ and $y$ and direction Z are mutually perpendicular and pass through the dimple for the particular transducer, the dimple 184h for the transducer 152 and the dimple 176h for the transducer 150. A rotation or swinging movement in the direction X, which is about the axis $x$ extending vertically and toward the center C of shaft 46, may be considered a pitching movement of the transducer, such as the transducer 152 which is shown in FIG. 14. This movement is along a particular magnetic track $t$ of disk 20 or more accurately along a tangent T (see FIG. 1) to track $t$. A swinging movement or rotation in the direction Y about axis $y$ at right angles to axis $x$ may be considered a rolling movement of the transducer, and a translation in direction Z is of course at right angles to both of the axes $x$ and $y$. Although the directions of movement X, Y and Z and the axes $x$ and $y$ are shown (in FIG. 14) in connection with transducer 152 looking at its rear face 152r, it will be understood that the axes and directions of movement of transducer 150 are the same, looking at the rear face 150r (see FIG. 10) of transducer 150 corresponding to the rear face 152r of transducer 152 visible in FIG. 14.

As previously described, the disk 20 is relatively thin and flexible, and such disks thus cannot be expected to remain in a single fixed plane. The disks may be warped and may wobble, but the transducers 150 and 152 are so mounted as to nevertheless be held in contact with the disk 20 for reliable data transfer between the disk 20 and the transducers. If the disk 20 warps on a radial line, the transducer 152 rolls in direction Y about the axis $y$ (see FIG. 14) to remain in contact with the surface of disk 20, and the transducer 150 has simultaneous and corresponding rolling movement so that the faces 150a and 152a remain parallel and spaced only by the thickness of the disk 20. If the disk 20 warps on a circumferential line, as on track $t$, the transducer 152 pitches in direction X about axis $x$; and, with this movement also, the transducer 150 has a corresponding pitching movement; and the faces 150a and 152a remain parallel and separated only by the thickness of the disk 20. These pitching and rolling movements are about the dimples 184h and 176h (see FIGS. 10 and 12) and the universal joint connections of which these dimples are parts and are against the relatively light forces due to the normally flat leg portions 176d, 176e, 184d and 184e. When the disk 20 in its wobbling warps away from its normal plane, the transducer 152 translates in direction Z, and the transducer 150 has a simultaneous corresponding translating movement in this direction, with the faces 150a and 152a remaining parallel and spaced only by the thickness of the disk 20. Such movements of the transducers 150 and 152 are against the relatively high force provided by the spring portion 176b or spring portion 184b. Since under all of these movements of the transducers 150 and 152, they always remain in face to face contact with the disk 20 due to the spring forces from the springs 176 and 184, a magnetic reading or writing action may simultaneously take place with respect to the magnetic coatings on both sides of the disk 20 as previously mentioned.

Although the mounting for the transducer 152 allows the three degrees of motion in directions X, Y and Z, and transducer 150 may have similar movements, nevertheless, the data storage apparatus is effective to maintain the disk 20 against unnecessary movement in any of these directions at the places on the disk on which the transducers 150 and 152 bear. This is due to the action of the pressure member 146 which holds the disk assembly 18 firmly against the fixed platen portion 44 of the frame assembly 34 when data transferring is taking place (see FIG. 5). The platen portion 44 is positioned closely adjacent to the slots 28 of the disk assembly 18 through which the transducers 150 and 152 extend so as to maintain the disk 20 as fixed as possible in the vicinities of the transducers 150 and 152. Since disk 20 has clearance within jacket 22 to be rotatable therein, pressure member 146 and platen 44 do not absolutely accurately locate disk 20; nevertheless, the flexible gimbal springs 176 and 184 yield such as to hold both the transducers 150 and 152 in contact with disk 20 and located exactly opposite each other as disk 20 rotates. In addition, it will be noted that the platen portion 44 and pressure member 146 are located ahead of the slots 28 in the direction A of rotation of the disk 20 (see FIG. 3), and this minimizes any tendency of the disk 20 to warp circumferentially in the vicinity of the transducers 150 and 152 due to the fact that the disk is gripped (by platen portion 44 and pressure member 146) and due to the fact that the disk 20 is driven from its central region which is gripped between the collet 66 and drive rim 48. While disk 20 wobbles and is held by pressure member 146, the side edges of the disk assembly 18 may wobble also; and the slots 40 (see FIG. 5) are thus purposely made relatively wide to allow this wobbling at the side edges of the disk assembly 18 to be unimpeded and to thus provide no warping effect on the disk between the transducers 150 and 152.

The carriage 70 may be moved radially on the disk 20 so that each of the transducers 150 and 152 is effective on tracks that are located at different distances with respect to the center c of the disk 20 by energizing the motor 84 (see FIG. 4) in one direction or the other. When the motor 84 is energized in one direction, it acts by means of the motor pulley 88 and band 86 to move the carriage 70 in one direction; and, when the motor 84 is energized in the other way, the carriage 70 is moved in the other direction by the motor pulley 88 and band 86.

It should be noted that the transducer 150 floats free of the load arm 182 except for the load arm portion 182g bearing on the dimple 176h and that the transducer 150 also floats free of the swing arm 104 while a data transferring action is taking place by the transducer 150. The fingers 182m are adapted to act on the spring portions 176f (see FIGS. 10 and 11) on retraction of the transducer 150 from the disk 20 as will be described, and the swing arm portions 104b (see FIG. 5) are adapted to act on the wing portions 182c also on retraction of the transducer 150. The fingers 182m and spring portion 176f and the swing arm portions 104b and wing portions 182c thus act as a pair of lost motion connections from the load arm 182 to the gimbal spring 176 and from the swing arm 104 to the load arm 182, but both of these lost motion connections are open during a data transferring action by the transducer 150 to allow the transducer 150 to freely move as the disk 20 wobbles as above described. The fingers 186m, spring portions 184f, the wing portions 186c and the arm portions 106b likewise function as similar lost motion connections for the swing arm 106 (see FIGS. 5, 12 and 13), and these lost motion connections are open in the same way to allow a floating action by the transducer 152 during a data transferring action.

When the data transferring action is complete and separation of the transducers 150 and 152 from disk 20 is desired, the electromagnet 130 is de-energized. The lever 134 is thus swung by the spring 140 in the counterclockwise direction as seen in FIG. 5, and this has the effect of moving the pressure member 146 away from the platen portion 44 to release the disk assembly 18. This swinging movement of the lever 134 also has the effect of acting on the hook 148 attached to the swing arm 104, and the arm 104 is thus swung in the counterclockwise direction as seen in FIG. 7 to move the transducer 150 out of a slot 28 of the disk assembly 18 and to a position remote from the disk 20. The arm 106 is moved in the clockwise direction as seen in FIG. 7 to also move its transducer 152 to a position remote from the disk 20, this being by virtue of the arm portions 104a and 106a. In this case, the lost motion connection provided by the fingers 182m on spring portions 176f and the lost motion connection provided by the wing portions 182c on the swing arm portions 104b for the transducer 150 are taken up, and the same is true of the corresponding lost motion connections for the transducer 152. The lost motion connections provided by the fingers 182m and 186m are particularly important during the transducer retracting action to assure that the transducers 150 and 152 retract with the corresponding swing arms 104 and 106 rather than staying in any contact with disk 20 due to the inertia of the transducers.

Advantageously, the mountings for the transducers 150 and 152 allow the flat bearing surfaces 150a and 152a of the transducers to run in contact with the magnetic disk 20 with no penetration of either of the transducers 150 and 152 in the disk 20 and with the compliance of the transducers 150 and 152 to the disk 20 being constant. This result is attained particularly since the transducer surfaces 150a and 152a, which are of the same size and shape, are located exactly opposite each other and in register with each other except for the thickness of the disk 20 between them. Since the disk 20 is then and flexible, it may be expected to wobble in directions X, Y and Z (see FIG. 14); and the two transducers 150 and 152 together move in these directions with the spacing between the transducers 150 and 152 remaining the same and equal to the thickness of the disk 20. In this connection, the relatively rigid load arms 182 and 186 acting under the spring influence of the spring portions 176b and 184b maintain the desired loading of the transducers 150 and 152 on the disk 20 and against each other while yielding in a direction Z with warping of the disk 20 in this direction Z. The springs 176 and 184 and particularly the spring portions 176d, 176e, and 176f for the transducer 150 and the spring portions 184d, 184e and 184f for the transducer 152 function to allow an easy pivoting of the transducers 150 and 152 in the directions X and Y to maintain the transducer surfaces 150a and 152a in firm contact with the surfaces of the disk 20 as the disk 20 wobbles either radially of the disk or circumferentially of the disk. No resistance to the pitching and rolling of the transducers is provided by the relatively rigid load arms 182 and 186, since the transducers pivot about the dimples 176h and 184h acting as pivot points and acting as universal joints with the load arm portions 182g and 186s. With the disclosed construction, because of the intimate, regular compliance of the transducers to the disk, the potential for high bit density is present. Also, due to the relatively low spring rate of the springs 176 and 184 functioning as gimbal springs as above mentioned and also due to the fact that there is no disk penetration by the transducers 150 and 152, and load forces applied onto the transducers 150 and 152 by the load arms 182 and 186 by reason of the deflected spring portions 176b and 184b may be kept to a minimum; and good transducer and disk wear life are thus characteristics of the disclosed apparatus. Since the two transducers 150 and 152 are in simultaneous contact with the disk 20, electronic switching may be used in connection with the transducers to first use one of the transducers for data transfer and then use the other transducer for data transfer without the need for mechanical action, such as to move the transducers into and out of contact with the disk mechanically.

The transducer surfaces 150a and 152a have been above described as being flat so that the flat surfaces of the transducers 150 and 152 in contact with the opposite faces of the disk 20 are exactly in register. Practically, it is preferred that the outer edges of the surfaces 150a and 152a be slightly rounded. Such rounded edges prevent the transducers 150 and 152 from digging into the surfaces of the disk when the transducers 150 and 152 are brought together for engaging with the disk 20 and during the time the transducers 150 and 152 pitch and roll. Also, if desired, the surfaces 150a and 152a may be provided with grooves or may have various profiles other than the plain flat surfaces previously described. It is desirable only that the parts of the surfaces 150a and 152a in the regions of the gaps 154a, 156a, 156b, 158a, 160b and 160a be substantially flat and in contact with the disk 20 and that the substantially flat disk contacting surfaces on the transducer 150 be matched by opposite substantially flat disk contacting surfaces on the other transducer 152.

As has been previously mentioned, the transducers 150 and 152 make face to face contact with the disk 20. This is attained particularly at relatively low speeds of disk 20, such as 360 rpm, with the magnetic tracks being at radii in the range of 1.9 inches to 3.7 inches from the center of the disk 20. If the speed of the disk 20 is increased substantially and if the transducer surfaces 150a and 152a are contoured appropriately, such as by being provided with beveled leading edges adjacent to the disk 20, considering the direction A of disk rotation, air bearings will exist between the transducers 150 and 152 and the disk 20. It is understood that the transducers 150 and 152 under these conditions will not then actually be in pressure contact with the disk 20; however, the same advantageous pitching, rolling and translating movements of the transducer 152 in directions X, Y and Z and corresponding movements of the transducer 150 are obtained even at these higher speeds and with a dependable data transferring action between the disk 20 and the transducers 150 and 152. Understandably, such disk to transducer separation achieved with air bearings reduces the wear on the transducers 150 and 152 and on the disk 20. In this high speed operation, one of the desirable modifications might be to locate the dimples 184h and 176h spaced from the centers of the transducers as they are seen in FIGS. 8 and 9 and locate them closer to the trailing transducer edges 150t and 152t than to the leading transducer edges 150p and 152p in order to keep the transducer faces 150a and 152a parallel with the disk 20 under these high speed conditions.

We claim:

1. A magnetic storage device comprising:
a thin flexible magnetic disk which due to its flexibility is subject to wobbling movements at places spaced from the center of the disk as the disk is rotated,
means for drivingly rotating said disk about its center,
a carriage movable transversely with respect to said disk,
a pair of transducers positioned at opposite faces of said disk and each having a disk engaging face, and
means mounting said transducers with respect to said carriage and including a universal joint connection for each of said transducers and including a spring means connecting each of said universal joint connections with said carriage and urging said transducers toward contacting positions with said disk,
each of said universal joint connections including a rounded part in contact with a companion part on which the rounded part may pivot, said rounded parts each being geometrically centered with respect to the disk engaging face of the respective transducer and being located directly opposite each other on an axis normal to the plane of said magnetic disk with said transducers being in contact with said disk on opposite sides thereof so that said transducers may pivot about their said universal joint connections to have corresponding but opposite pitching and rolling movements as said disk wobbles during its rotation.

2. A magnetic storage device as set forth in claim 1 and including gimbal spring means for connecting each of said transducers with said carriage and being of such construction as to apply a force resisting said pitching and rolling movements of the transducers that is small compared to the force applied by said first named spring means urging said transducers into a contacting position with said disk.

3. A magnetic storage device as set forth in claim 1 and including gimbal spring means on which each of said transducers is fixed and which connects the transducer with said carriage; each of said gimbal spring means including a pair of opposite spring legs connected by a connecting spring portion, with the transducer being fixed on said connecting spring portion.

4. A magnetic storage device as set forth in claim 1, each of said rounded parts constituting a dimple fixed with respect to the associated one of said transducers and each of said companion parts coacting with a said rounded part constituting a flat part carried by the said spring means effective on the associated one of said transducers.

5. A magnetic storage device comprising:
a thin disk of magnetically permeable material having coatings of magnetic material on opposite faces thereof,
means for drivingly rotating said disk about its center,
a carriage movable radially with respect to said disk,
a pair of transducers, and
means mounting said transducers with respect to said carriage so that said transducers are held in positions at opposite faces of said disk directly opposite each other and the transducers move across the faces of said disk with corresponding movements of said carriage,
each of said transducers including a magnetic core having a gap therein and a winding electrically coupled with the core,
said magnetic cores of said transducers being located at substantially different distances radially from the center of said disk so that there is substantially no crosstalk between said cores and their said windings.

6. A magnetic storage device for accommodating a thin flexible magnetic disk which is subject to wobbling as it rotates, said storage device comprising:
means for gripping such a disk,
means for drivingly rotating such a disk using said disk gripping means,
a carriage movable toward and away from said disk gripping means so as to thereby move across a disk so gripped,
a pair of transducers each having a disk engaging face,
a universal joint connection connected to each of said transducers and including a rounded part engaging a coacting opposite part, and
a pair of spring means carried by said carriage and connected with said universal joint connections and so arranged to urge said transducers toward each other with the disk engaging faces of said transducers having their centers in registry and with said rounded parts of said universal joint connections lying on an axis extending normally to said faces at their centers, whereby said universal joint connections allow pitching and rolling movements of said transducers about their said rounded parts with said transducer faces remaining in contact with a magnetic disk therebetween as the magnetic disk wobbles with rotation thereof.

7. A magnetic storage device as set forth in claim 6, and including a gimbal spring means on which each of said transducers is fixed and which connects the transducer with said carriage.

8. A magnetic storage device as set forth in claim 6, said rounded part of each of said universal joint connections constituting a dimple fixed with respect to the associated one of said transducers and said coacting opposite part of each of said transducers constituting a portion bearing on said dimple.

9. A magnetic storage device for accommodating a thin magentic disk of non-magnetic material having magnetic coatings on the faces of the disk, said storage device comprising:
means for gripping such a disk,
means for drivingly rotating such a disk using said gripping means,
a carriage movable toward and away from said gripping means,
a pair of transducers, and
spring means connected with each of said transducers and carried by said carriage in such manner as to tend to move said transducers together in registry with each other and effectively connecting said transducers with said carriage so that said transducers move across a disk held by said gripping means as said carriage moves toward and away from said gripping means,
each of said transducers including a magnetic core having a winding electrically coupled therewith,
said transducers being of such construction that their said cores are different distances from said gripping means and are thus out of line with respect to each other when said transducers are in registry with each other so as to prevent crosstalk between said cores and windings of said transducers when a thin disk of non-magnetic material is disposed between them.

10. A magnetic storage device comprising a thin flexible magnetic disk,
means for rotating said disk,
a carriage movable transversely with respect to said disk and carrying a pair of transducers located directly opposite each other on opposite sides of the disk,
a pair of universal joint connections each supporting one of said transducers, and
a pair of spring means carried by said carriage and respectively effective on said universal joint connections for urging said transducers toward each other in a direction normal to the plane of the disk and yielding with corresponding movements of said transducers in said direction while said universal joint connections allow corresponding pitching and rolling movements of said transducers about axes that are at right angles to each other and to said direction on wobbling of said disk with said spring means being effective to maintain said transducers in data transferring relationship with said disk,
said two transducers having cores extending through them which are respectively closer to and farther from the center of said disk and have coils electrically coupled with said cores which are correspondingly located on surfaces of the transducers remote from said disk, said spring means each including a leaf spring portion mounted as a cantilever with respect to said carriage and a relatively rigid load arm fixed to it both of which extend toward a center region of said disk, said universal joint connections each including one of said load arms and a dimple fixed with respect to the corresponding one of said transducers, the load arm for the one of said transducers having its coils most remote from the center of said disk extending around the said coils of this transducer and having a terminating portion extending in a direction away from the center of said disk and into contact with the corresponding one of said dimples to form one of said universal joint connections and the other of said load arms terminating at a point farther from the center region of said disk than the said coils on the corresponding one of said transducers and having a terminating portion extending toward the center region of said disk and into contact with the corresponding one of said dimples to form the other of said universal joint connections.

11. A magnetic storage device for use with a thin disk of non-magnetic material having magnetic coatings thereon, said device comprising:
means for gripping such a disk,
means for drivingly rotating such a disk utilizing said gripping means,
a carriage movable toward and away from said gripping means so as to thereby move across a disk carried by said gripping means,
a pair of transducers carried by said carriage and having a pair of active faces located in registry with each other and between which a disk carried by said gripping means may be interposed,
a pair of universal joints each supporting one of said transducers,
a pair of spring means carried by said carriage and respectively effective on said universal joints for urging said transducers toward each other whereby the transducers may yield normally to their said active faces and may pitch and roll about said universal joints with wobbling movements of a disk carried by said gripping means,
said two transducers having cores extending through them which are respectively closer to and farther from said disk gripping means and have coils electrically coupled with said cores which are correspondingly located on surfaces of the transducers remote from their said active faces,
said spring means each including a leaf spring portion mounted as a cantilever with respect to said carriage and a relatively rigid load arm fixed to the leaf spring portion both of which extend toward said gripping means, said universal joints each including one of said load arms and a rounded part fixed with respect to the corresponding one of said transducers,
said load arm for the one of said transducers having its coils most remote from said gripping means extending around the said coils of this transducer and having a terminating portion extending in a direction away from said gripping means and into contact with the corresponding one of said rounded parts to form one of said universal joints and the other of said load arms terminating at a point farther from said gripping means than the said coils on the corresponding one of said transducers and having a terminating portion extending toward said gripping means and into contact with the corresponding one of said rounded parts to form the other of said universal joints.

12. A magnetic transducer carriage assembly for use with a thin flexible magnetic disk which due to its flexibility is subject to wobbling movements at places spaced from the center of the disk as the disk is rotated, said assembly comprising:
- a carriage body,
- a pair of transducers adapted to be positioned at opposite faces of the disk and each having an active face adapted to contact the disk or be in near contact with the disk, and
- means mounting said transducers with respect to said carriage body and including a universal joint connection for each of said transducers and including a spring means connecting each of said universal joint connections with said carriage body and urging said transducers together and therefore toward contact with the disk when positioned between them,
- each of said universal joint connections including a rounded part in contact with a companion part on which the rounded part may pivot, said rounded parts each being geometrically centered with respect to said active face of the respective transducer and being located directly opposite each other on an axis normal to said active transducer faces when they are in contact with each other or are in contact or near contact with a disk positioned between them so that said transducers may pivot about their said universal joint connections to have corresponding but opposite pitching and rolling movements as a disk positioned between them wobbles during its rotation.

13. An assembly as set forth in claim 12 and including gimbal spring means for connecting each of said transducers with said carriage body and being of such construction as to apply a force resisting said pitching and rolling movements of the transducers that is small compared to the force applied by said first named spring means urging said transducers together.

14. An assembly as set forth in claim 12 and including gimbal spring means on which each of said transducers is fixed and which connects the transducer with said carriage body, each of said gimbal spring means including a pair of opposite spring legs connected by a connecting spring portion with the respective transducer being fixed on said connecting spring portion.

15. An assembly as set forth in claim 12, each of said rounded parts constituting a dimple fixed with respect to the associated one of said transducers and each of said companion parts coacting with a said rounded part constituting a flat part carried by the said spring means effective on the associated one of said transducers.

16. A magnetic transducer carriage assembly for use with a thin magnetic disk which due to its lack of thickness and the material of which it is made may pass magnetic lines of force through it, comprising:
- a carriage body,
- a pair of transducers each having an active face adapted to engage or be in near engagement with a disk positioned between the transducers, and
- means mounting said transducers with respect to said carriage body and urging said transducers and their said active faces toward each other,
- each of said transducers including a magnetic core having a gap therein and a winding electrically coupled with the core,
- said magnetic cores of said transducers being located out of line with respect to each other when said active transducer faces are in contact so that there is substantially no crosstalk between said cores and their said windings when one or the other of said windings is energized.

17. A magnetic transducer carriage assembly for use with a thin flexible magnetic disk which due to its flexibility is subject to wobbling movements at places spaced from the center of the disk as the disk is rotated, said assembly comprising:
- a carriage body;
- a pair of transducers adapted to be positioned at opposite faces of said disk and each having a flat disk engaging face;
- means mounting said transducers with respect to said carriage body and including a universal joint connection for each of said transducers and including a spring means connected with said carriage body adjacent to one of its ends and respectively effective along with each of said universal joint connections for urging said transducers toward each other in a direction normal to their said flat faces and yielding with corresponding movements of said transducers in said normal direction while said universal joint connections allow corresponding pitching and rolling movements of said transducers about axes that are at right angles to each other and to said normal direction on wobbling of said disk, with said spring means being effective to maintain said transducers in data transferring relationship with said disk;
- said two transducers having cores extending through them which are respectively closer to and farther from the end of said carriage body on which said spring means are mounted and have coils electrically coupled with said cores which are correspondingly located on surfaces of the transducers remote from their said flat surfaces, said spring means each including a leaf spring portion mounted as a cantilever on said carriage adjacent to said carriage end and a relatively rigid load arm fixed to it both of which extend toward said transducers, said universal joint connections each including one of said load arms and a dimple fixed with respect to the corresponding one of said transducers, the load arm for the one of said transducers having its coils closest to said carriage end extending around the said coils of this transducer and having a terminating portion extending in a direction toward said carriage end and into contact with the corresponding one of said dimples to form one of said universal joint connections and the other of said load arms terminating at a point closer to said carriage end than the said coil on the corresponding one of said transducers and having a terminating portion extending away from said carriage end and into contact with the corresponding one of said dimples to form the other of said universal joint connections.

18. A magnetic storage device comprising:

a thin flexible magnetic disk which due to its flexibility is subject to wobbling movements at places spaced from the center of the disk as the disk is rotated, means for drivingly rotating said disk about its center, a carriage movable transversely with respect to said disk, a pair of transducers positioned at opposite faces of said disk and having active faces which are positioned opposite each other, a universal joint connection connected with each of said transducers so that the transducers may have corresponding but opposite pitching and rolling movements while remaining in contact or near contact with said disk by means of said active faces as the disk wobbles at places spaced from the center of the disk as the disk is rotated, and a spring means connecting the said universal joint connection for each of said transducers with said carriage and urging the transducer toward the other said transducer and toward contacting position with said disk and yielding to provide movement of the transducer in a direction normal to the disk as the disk wobbles during rotation and acting along with the connected universal joint connection and transducer as a support for the flexible disk with respect to the loading force applied by the other of said transducers and its said spring means and universal joint connection.

19. A magnetic storage device as set forth in claim 18, said thin flexible magnetic disk being made of a thin plastic of about 0.003 inch thickness.

20. A magnetic storage device as set forth in claim 18, said thin flexible magnetic disk being made of a thin flexible plastic of about 0.003 inch thickness and being enclosed in an envelope of a flexible but thicker sheet plastic, said envelope being provided with slots in its opposite thicknesses through which said transducers may extend to have contact or near contact with said disk.

21. A transducer load arm assembly for use in connection with a magnetic disk and comprising:

a load arm adapted to be moved toward and away from a magnetic disk, a transducer having an active face for making contact with the magnetic disk, spring means having two legs on opposite sides of said transducer and having said transducer mounted thereon and connected with said load arm so as to apply spring force onto the transducer, additional spring means connected with said load arm and applying a force centrally of said transducer and normal to the active face of the transducer for urging the transducer into pressure contact with the disk, means carried by said additional spring means and forming a lost motion connection with said first named spring means so as to move said transducer in a retracting direction away from the disk when said additional spring means is so moved, and means forming an additional lost motion connection between said load arm and said additional spring means so as to move said additional spring means in a retracting direction away from said disk when said load arm is moved in this direction so as to cause corresponding retracting movement of said transducer through said first named lost motion connection.

22. An arm assembly as set forth in claim 21, said first named spring means including a two legged cantilever spring connected at a certain place to said load arm and having said transducer fixed thereon at a place remote from its place of connection to said load arm, said additional spring means including a second cantilever spring connected to said load arm at about the same place as said first named cantilever spring is connected to said load arm and having a rigid force applying arm connected thereto and applying a force on said transducer normal to the active face thereof, said first named lost motion connection including an ear carried by said rigid force applying arm and overlying said cantilever spring of said first named spring means for moving said transducer in a retracting direction, said second named lost motion connection including a second ear carried by said load arm and overlying said rigid force applying arm for moving said rigid force applying arm in a retracting direction when said load arm is moved in this direction.

23. A transducer assembly for use with a thin flexible medium of a type capable of carrying data and which due to its flexibility is subject to wobbling movements as the medium is moved, said assembly comprising:

means for drivingly moving said medium, a support, a pair of transducers adapted to be positioned at opposite faces of the medium and each having an active face adapted to contact the medium or be in very near contact with the medium, and means mounting said transducers with respect to said support and including a universal joint connection for each of said transducers and including a spring means connecting each of said universal joint connections with said support and urging said transducers together and therefore toward contact with the medium when positioned between them, each of said universal joint connections including a rounded part in contact with a companion part on which the rounded part may pivot, said rounded parts each being located in a central region with respect to said active face of the respective transducer and being located directly opposite each other on an axis normal to said active transducer faces when they are in contact with each other or are in contact or very near contact with a flexible medium positioned between them so that said transducers may pivot about their said universal joint connections to have corresponding but opposite pitching and rolling movements as a medium positioned between them wobbles during its movement.

24. An assembly as set forth in claim 23 and including gimbal spring means for connecting each of said transducers with said support and being of such construction as to apply a force resisting said pitching and rolling movements of the transducers that is small compared to the force applied by said first named spring means urging said transducers together.

25. A magnetic transducer support assembly for use with a thin magnetic medium which due to its lack of thickness and the material of which it is made may pass magnetic lines of force through it, comprising:

a support, a pair of magnetic transducers each having an active face adapted to engage or be in very near engagement with a said medium positioned between the transducers, and means mounting said transducers with respect to said support and holding said transducers and their active faces in engagement or very near engagement with said medium, each of said transducers including a magnetic core and a winding electrically coupled with the core, said magnetic cores of said transducers being located out of line with respect to each other when said active transducer faces are in contact so that there is substantially no crosstalk between said cores and their said windings when one or the other of said windings is energized.

26. A data storage device comprising:

a thin flexible medium which due to its flexibility is subject to wobbling movements as the medium moves, means for drivingly moving said medium, a support, a pair of transducers positioned at opposite faces of the medium and having active faces which are positioned opposite each other, a universal joint connection connected with each of said transducers so that the transducers may have corresponding but opposite pitching and rolling movements while remaining in contact or very near contact with the medium by means of said active faces as the medium wobbles due to its movement, and a spring means connecting the said universal joint connection for each of said transducers with said support and urging the transducer toward the other said transducer and toward contacting position with said medium and yielding to provide movement of the transducer in a direction normal to the medium as the medium wobbles during movement and acting along with the connected universal joint connection and transducer as a substentation for the flexible medium with respect to the loading force applied to the medium by the other of said transducers and its said spring means and universal joint connection.

27. A transducer load arm assembly for use in connection with a medium capable of carrying data information and comprising:

a load arm adapted to be moved toward and away from said medium, a transducer adapted to be positioned at a face of the medium and having an active face adapted to contact the medium or be in very near contact with the medium, spring means connected with said load arm and having said transducer fastened thereto and holding said transducer in contact or very near contact with said medium so that there may be a data transferring action between the transducer and said medium, and a lost motion connection between said load arm and said spring means which applies no force on said spring means and thereby on said transducer when the transducer is in contact or very near contact with said medium and which is taken up when said load arm is moved in a direction to retract the transducer from said medium so as to positively retract the transducer from the medium along with retracting movement of said load arm.

28. A transducer load arm assembly for use in connection with a thin flexible medium adapted to carry data information and which due to its flexibility is subject to wobbling movements as the medium is moved, said assembly comprising:

means for drivingly moving said medium, a load arm adapted to be moved toward and away from said medium, a transducer having an active face for being in contact or very near contact with the medium for a data transferring action therewith, a spring of thin spring sheet material having said transducer fixed thereto and adapted to accommodate a wobbling movement of the transducer corresponding to wobbling movements of the flexible medium when the transducer is in contact or very near contact with the medium in a data transferring action, a connection between said load arm and said transducer so that said load arm may apply a force to the transducer urging the transducer toward a contacting position with said medium, and a lost motion connection between said load arm and said spring which is open when said transducer is in contact or very near contact with said medium so that the load arm does not thereby provide a restraining action on the wobbling movements of said transducer during the wobbling movements of said medium and being taken up to provide a positive retraction force on said spring and on said transducer when said load arm is moved in a direction away from said medium in a transducer retracting direction.

* * * * *

UNITED STATES PATENT AND TRADEMARK OFFICE
CERTIFICATE OF CORRECTION

PATENT NO. : 4,089,029

DATED : May 9, 1978

INVENTOR(S) : Daniel O. Castrodale, William J. Pendy, Jr. and William S. Wentink It is certified that error appears in the above-identified patent and that said Letters Patent are hereby corrected as shown below:

Column 21, lines 41 and 42, cancel "substentation", and insert --sustentation--.

Signed and Sealed this

Eighteenth Day of December 1979

[SEAL]

Attest:

SIDNEY A. DIAMOND

Attesting Officer

Commissioner of Patents and Trademarks